(12) United States Patent
Hsu et al.

(10) Patent No.: US 8,690,351 B2
(45) Date of Patent: Apr. 8, 2014

(54) LIGHT SOURCE DEVICE AND PROJECTOR

(75) Inventors: Chien-Wen Hsu, New Taipei (TW); Wen-Pin Yeh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 65 days.

(21) Appl. No.: 13/472,511

(22) Filed: May 16, 2012

(65) Prior Publication Data

US 2013/0107222 A1 May 2, 2013

(30) Foreign Application Priority Data

Oct. 26, 2011 (TW) .............................. 100138789 A

(51) Int. Cl.
*G03B 21/14* (2006.01)

(52) U.S. Cl.
USPC .................. 353/84; 353/30; 353/31; 353/38; 353/85; 353/122; 348/744; 348/745

(58) Field of Classification Search
USPC .......... 353/30, 31, 33, 34, 38, 77, 78, 98, 84, 353/85, 119, 122; 348/743–747, E5.133, 348/E5.141, E9.027; 349/5, 7–9

See application file for complete search history.

(56) References Cited

U.S. PATENT DOCUMENTS

| 8,398,247 | B2 * | 3/2013 | Miyazaki ........................ 353/85 |
| 8,496,352 | B2 * | 7/2013 | Bartlett ......................... 362/259 |
| 2007/0019408 | A1 * | 1/2007 | McGuire et al. .............. 362/231 |
| 2011/0249242 | A1 * | 10/2011 | Saitou et al. .................... 353/98 |
| 2011/0304830 | A1 * | 12/2011 | Kato et al. ...................... 353/84 |

FOREIGN PATENT DOCUMENTS

TW 200905361 A 2/2009

* cited by examiner

*Primary Examiner* — Sultan Chowdhury
(74) *Attorney, Agent, or Firm* — Altis Law Group, Inc.

(57) ABSTRACT

A projector includes a projection lens set, a digital micromirror device, a prism unit, a light merging unit, a light guide unit, and a light source device. The light source device includes a laser light source and a color wheel. The laser light source is positioned in a straight optical path and generates a first light. The color wheel is positioned in the straight optical path. The first light irradiates the color wheel to generate a second light and the third light. The light merging unit merges the first, second, and third lights to generate a mixed light. The light guide unit guides the mixed light to the prism unit. The mixed light is refracted to the DMD via the prism unit, and then the refracted mixed light is reflected to the projection lens set via the DMD.

9 Claims, 2 Drawing Sheets

LIGHT SOURCE DEVICE AND PROJECTOR

BACKGROUND

1. Technical Field

The present disclosure relates to a light source device and a projector having a light source device.

2. Description of Related Art

Heightened requirements are imposed on the imaging quality of projectors. A projection system primarily includes a light source device and a projection lens set. Emphasis has been put on improving the arrangement reliability of components, to shrink the overall volume and increase the light source efficiency in the light source device to enhance the imaging brightness in the back-end projection lens set.

To improve the image brightness, a conventional projector utilizes a number of light sources to provide various color lights. However, the light sources of such light source devices not only lead to a complex and bulky design of the internal structure of the projector, but also causes a build up of heat, exacerbated by poor heat dissipation. After a period of operation, the high temperatures tend to shorten the lifetime of the projector and cause damage to the light source device.

Thus, there is a need for a projector which can overcome the above described shortcomings.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
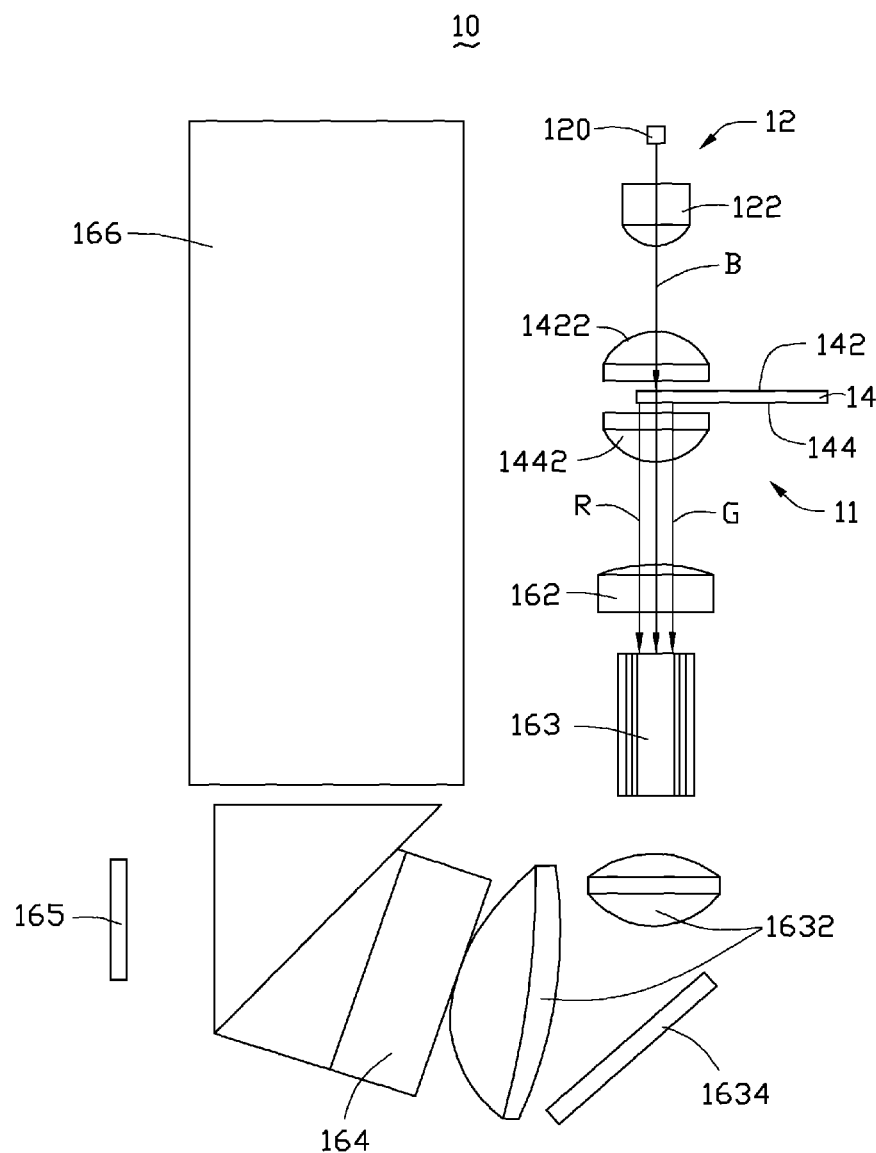
FIG. 1 is a schematic view of one embodiment of a projector.

According to one embodiment, a projector 10 as illustrated in FIG. 1 includes a light source device 11, a light merging unit 162, a light guide unit 163, a prism unit 164, a digital micro-mirror device (DMD) 165, and a projection lens set 166. The projector 10 also comprises a mirror 1634 and a number of lenses 1632, 1422, and 1442. The light source device 11 and the projection lens set 166 are positioned at two sides of the projector 10. In one embodiment, the light guide unit 163 is a light tunnel. The prism unit 164 is a reverse total internal reflection (TIR) prism including two prisms combined together.

The light source device 11 includes a laser light source 12 and a color wheel 14. The laser light source 12, the lenses 1422 and 1442, the color wheel 14, the light merging unit 162, and the light guide unit 163 are positioned in the projector 10 along a straight optical path. The lens 1422 is positioned between the light source device 11 and the color wheel 14. The lens 1442 is positioned between the color wheel 14 and the light merging unit 162.

The laser light source 12 includes a laser generator 120 and a lens 122. The color wheel 14 has a first surface 142 and a second surface 144 opposite to the first surface 142. When the projector 10 operates, the laser light source 12 generates a first light along the straight optical path. In one embodiment, the laser generator 120 of the laser light source 12 generates a blue light B. The lens 122 focuses the blue light B generated by the laser generator 120. The blue light B irradiates a surface of the color wheel 14. In the illustrated embodiment, the blue light B irradiates the first surface 142 of the color wheel 14 through the lenses 122 and 1422.

Figure 2:
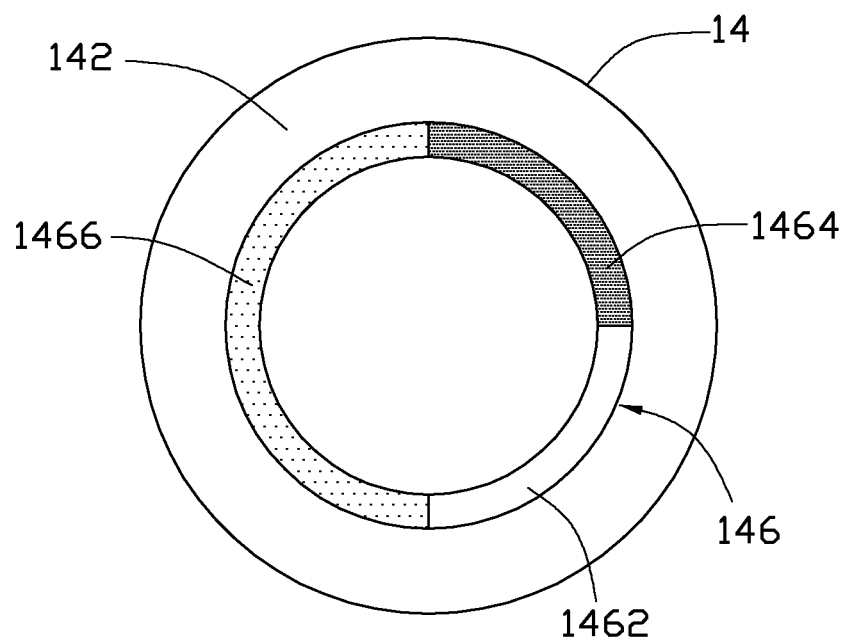
FIG. 2 is a schematic view of one embodiment of a color wheel of the projector shown in FIG. 1.

Referring to FIG. 2, the color wheel 14 includes an annular irradiative area 146. The annular irradiative area 146 has a first irradiative area 1462, a second irradiative area 1464, and a third irradiative area 1466. The first irradiative area 1462 is a transparent area without phosphor layer. A first phosphor layer is applied on the second irradiative area 1464. A second phosphor layer is applied on the third irradiative area 1466. The first phosphor layer can be disposed on the first surface 142 of the color wheel 14 or the second surface 144 of the color wheel 14. Similarly, the second phosphor layer can be disposed on the first surface 142 of the color wheel 14 or the second surface 144 of the color wheel 14. In one embodiment, the first and second phosphor layers are disposed on the first surface 142 of the color wheel 14. In another embodiment, the first and second phosphor layers are disposed on the second surface 144 of the color wheel 14. When the blue light B irradiates the second irradiative area 1464 of the color wheel 14, the first phosphor layer of the second irradiative area 1464 generates a second light due to the irradiation of the blue light B. In one embodiment, the second light is a red light R. When the blue light B irradiates the third irradiative area 1466 of the color wheel 14, the second phosphor layer of the third irradiative area 1466 generates a third light due to the irradiation of the blue light B. In one embodiment, the third light is a green light G.

When the blue light B irradiates the first irradiative area 1462 of the color wheel 14, the blue light B passes through the first irradiative area 1462 of the color wheel 14 and irradiates the light merging unit 162 due to the transparency of the first irradiative area 1462. The red light R irradiates the light merging unit 162 through the lens 1442. Similarly, the green light G irradiates the light merging unit 162 through the lens 1442.

The light merging unit 162 merges the blue light B generated by the laser light source 12, the red light R generated by the first phosphor layer of the second irradiative area 1464, and the green light G generated by the second phosphor layer of the third irradiative area 1466 to generate a mixed light. The light guide unit 163 guides the mixed light to the prism unit 164 by the reflection of the mirror 1634 and the focusing of the lens 1632. The mixed light is refracted to the DMD 165 via the prism unit 164. The refracted mixed light is reflected to the projection lens set 166 via the DMD 165. In this way, the projector 10 can project an image on a screen.

It is to be understood that the above-described embodiments are intended to illustrate rather than limit the disclosure. Any element described in accordance with any embodiments is understood to be usable additionally or in substitution for elements in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A light source device for a projector, comprising:
a laser light source, positioned in a straight optical path, the laser light source being configured for generating a first light along the straight optical path; and
a color wheel positioned in the straight optical path;
wherein the color wheel has a surface comprising an annular irradiative area, the annular irradiative area comprises a first irradiative area, a second irradiative area with a first phosphor layer, and a third irradiative area with a second phosphor layer, the first irradiative area is a transparent area without phosphor layer, the first light irradiates the first phosphor layer of the second irradiative area to generate the second light, irradiates the second phosphor layer of the third irradiative area to generate the second light, and transmits through the first irradiative area.

2. The light source device as claimed in claim 1, further comprising a plurality of lenses positioned in the straight optical path, wherein the plurality of lenses is positioned between the laser light source and the color wheel.

3. The light source device as claimed in claim 1, wherein the first light is a blue light, the second light is a red light, and the third light is a green light.

4. A projector, comprising:
a light source device comprising:
a laser light source, positioned in a straight optical path, the laser light source being configured for generating a first light along the straight optical path; and
a color wheel positioned in the straight optical path, wherein the color wheel has a surface comprising an annular irradiative area, the annular irradiative area comprises a first irradiative area, a second irradiative area with a first phosphor layer, and a third irradiative area with a second phosphor layer, the first irradiative area is a transparent area without phosphor layer; the first light irradiates the first phosphor layer of the second irradiative area to generate the second light, irradiates the second phosphor layer of the third irradiative area to generate the second light, and transmits through the first irradiative area to the light merging unit;
a light merging unit configured for merging the first, second, and third lights to generate a mixed light;
a projection lens set;
a digital micro-mirror device (DMD);
a prism unit; and
a light guide unit configured for guiding the mixed light to the prism unit;
wherein the mixed light is refracted to the DMD via the prism unit, and then the refracted mixed light is reflected to the projection lens set via the DMD.

5. The projector as claimed in claim 4, wherein the light source device further comprises a plurality of lenses positioned in the straight optical path, wherein the plurality of lenses is positioned between the laser light source and the color wheel.

6. The projector as claimed in claim 4, wherein the light source device further comprises a lens positioned in the straight optical path, wherein the lens is positioned between the color wheel and the light merging unit.

7. The projector as claimed in claim 4, wherein the prism unit is a reverse total internal reflection (TIR) prism.

8. The projector as claimed in claim 7, wherein the reverse TIR prism comprises two prisms combined together.

9. The projector as claimed in claim 4, wherein the first light is a blue light, the second light is a red light, and the third light is a green light.

* * * * *